United States Patent
Coombes et al.

[11] Patent Number: 5,822,694
[45] Date of Patent: Oct. 13, 1998

[54] METHOD AND APPARATUS FOR PROVIDING COMMUNICATION SERVICES TO A COMMUNICATION UNIT BASED ON REGISTRATION TYPE

[75] Inventors: Daniel J. Coombes, Glen Ellyn; Jay R. Krebs, Crystal Lake, both of Ill.

[73] Assignee: Motorala, Inc.

[21] Appl. No.: 912,835

[22] Filed: Aug. 19, 1997

Related U.S. Application Data

[63] Continuation of Ser. No. 496,987, Jun. 30, 1995, abandoned.
[51] Int. Cl.[6] .............................. H04M 11/00; H04B 1/00
[52] U.S. Cl. ......................... 455/433; 455/435; 455/458; 455/517
[58] Field of Search ................................... 455/426, 432, 455/433, 435, 456, 457, 458, 517, 518, 520, 422, 434, 524, 525

[56] References Cited

U.S. PATENT DOCUMENTS

| | | | |
|---|---|---|---|
| 4,775,999 | 10/1988 | Williams | 379/59 |
| 5,054,110 | 10/1991 | Comroe | 455/33 |
| 5,175,872 | 12/1992 | Borras | 455/33.1 |
| 5,305,466 | 4/1994 | Taketsugu | 455/56.1 |
| 5,357,561 | 10/1994 | Grube | 455/33.1 |
| 5,408,683 | 4/1995 | Ablay et al. | 455/56.1 |
| 5,517,690 | 5/1996 | Lindquist et al. | 455/56.1 |
| 5,524,136 | 6/1996 | Bar-Noy et al. | 455/56.1 |
| 5,548,631 | 8/1996 | Krebs et al. | 455/426 |

*Primary Examiner*—Nguyen Vo
*Assistant Examiner*—Lester G. Kincaid
*Attorney, Agent, or Firm*—Daniel C. Crilly

[57] ABSTRACT

A communication system (100) that includes a plurality of communication units (101–108) and infrastructure equipment (110–115, 140, 141) employs a method and apparatus for providing communication services to a communication unit (e.g., 101). The infrastructure equipment includes a plurality of base sites (110–115) that provide communication services to corresponding service coverage areas (120–125). The service coverage areas (120–125) are further arranged into paging location areas (130–132). When the communication unit (101) becomes active in the system (100), the communication unit (101) determines its registration type. When the communication unit (101) is of a first registration type, the communication unit (101) transmits a registration message to the infrastructure equipment (e.g., 141) whenever the unit (101) enters a new location area (130–132). When the communication unit (101) is of a second registration type, the communication unit (101) transmits the registration message to the infrastructure equipment (141) whenever the unit (101) enters a new service coverage area (120–125). Thus, when the infrastructure equipment (141) receives a communication destined for the communication unit (101), the infrastructure equipment (141) conveys the communication to the communication unit (101) based on the unit's registration type. However when the communication unit is of a first registration type corresponding to the first registration process, in which the infrastructure pages the communication unit prior to conveying a communication to the unit, and the location area containing the communication unit consists of a "single service coverage area" communication is conveyed directly to the communication unit without first paging the unit.

7 Claims, 4 Drawing Sheets

FIG. 1

| COMM. UNIT ID | REGISTRATION TYPE | LOCATION AREA ID | SITE ID |
|---|---|---|---|
| 101 | 1 | 130 | - |
| 102 | 2 | 130 | 111 |
| 103 | 2 | 131 | 112 |
| 104 | 2 | 131 | 113 |
| 105 | 1 | 131 | - |
| 106 | 1 | 131 | - |
| 107 | 2 | 132 | 115 |
| 108 | 1 | 132 | - |

REGISTRATION TABLE
200

| LOCATION AREA ID | SITE ID |
|---|---|
| 130 | 110, 111 |
| 131 | 112, 113, 114 |
| 132 | 115 |

LOCATION AREA ID TO SITE ID TABLE
201

METHOD AND APPARATUS FOR PROVIDING COMMUNICATION SERVICES TO A COMMUNICATION UNIT BASED ON REGISTRATION TYPE

This is a continuation of application Ser. No. 08/496,987, filed Jun. 30, 1995 and now abandoned.

FIELD OF THE INVENTION

The present invention relates generally to communication systems and, in particular, to providing communication services to a communication unit in a communication system based on the communication unit's registration type.

BACKGROUND OF THE INVENTION

Radio communication systems, such as trunked radio systems or cellular systems, are known to include a system controller, a plurality of base sites, and a plurality of communication units, such as mobile radios, portable radios, or radiotelephones. Each base site serves a corresponding service coverage area and typically provides at least one traffic channel and a control channel to communication units located within its service coverage area. The traffic channels are utilized to convey information between communication units or between communication units and public switched telephone network (PSTN) subscribers. The control channel is used to convey system information between the communication units and the particular base site.

During a typical communication, a communication unit moves throughout service coverage areas of the system. The movement of the communication unit requires the system controller to track the location of the communication unit within the system to enable the system controller to alert the communication unit when a call involving the communication unit is received at the system controller. That is, the system controller must know approximately where the communication is located in order to assign an appropriate base site to support a communication for the communication unit.

One prior art approach to tracking communication unit movement is known as the coverage area update approach. The coverage area update approach requires a communication unit to report, or register, each time the communication unit enters a different service coverage area. The communication unit monitors the system control channel to obtain, among other things, the identification of the base site serving the coverage area containing the communication unit. Upon observing a change in the base site identification on the control channel, the communication unit transmits an inbound message on the control channel to register with the system controller in the new service coverage area. Therefore, when a communication arrives at the system controller for a particular communication unit, the system controller simply transmits the communication to the communication unit via the base site serving the service coverage area containing the communication unit. Although this approach facilitates expedient call set-up because the system controller always knows the service coverage area within which a particular communication unit is located, the approach requires substantial inbound signaling on the control channel to maintain location reporting accuracy to within a base site's service coverage area. Excessive inbound control channel activity results in inefficient use of both the control channel and system controller resources that are necessary to process the abundance of registration messages.

Another known approach to tracking communication unit movement is known as the location area update approach. The location area update approach requires a communication unit to report, or register, each time the communication unit enters a different so-called paging location area. A paging location area typically comprises multiple base site service coverage areas and, accordingly, is serviced by multiple base sites. With this approach, the communication unit monitors the system control channel to obtain the identification of the location area containing the communication unit. Upon observing a change in the location area identification on the control channel, the communication unit transmits an inbound message on the control channel to register with the system controller in the new location area. Since the number of location areas is less than the number of service coverage areas, the communication unit registers proportionately less with the location area update approach than with the coverage area update approach. Thus, the location area update approach involves substantially less inbound control channel activity than does the coverage area update approach.

With location area updating, when a communication arrives at the system controller for a particular communication unit, the system controller pages the communication unit from all the base sites serving the location area containing the communication unit. Upon receiving an acknowledgment of the page from the communication unit, the system controller transmits the communication to the communication unit via the base site that received the acknowledgment. Although the location area update approach reduces inbound control channel activity as compared with the coverage area update approach, the paging requirement of the location area update approach prior to transmission of the communication delays the call set-up process. The call set-up delay can be as much as a few seconds. A few second delay is of little impact for standard cellular services, but has substantial impact for dispatch services that require call set-up times of a few hundred milliseconds.

In addition, the location area update approach is susceptible to excessive, simultaneous inbound control channel activity when multiple communication units are paged for a dispatch call in the same service coverage area. When all the paged communication units attempt to respond to, or acknowledge, their pages simultaneously, a "collision" of the responses occurs that prevents most, if not all, the responses from reaching the system controller. The communication units whose responses collided must retransmit their responses, thereby adding to the aforementioned call set-up delay.

Therefore, a need exists for a method and apparatus for providing a communication to a communication unit that permits both dispatch and standard cellular services, while mitigating inbound control channel activity, providing expedited call set-up for dispatch calls, and obviating paging response collisions.

DESCRIPTION OF A PREFERRED EMBODIMENT

Generally, the present invention encompasses a method and apparatus for providing communication services to a communication unit in a communication system that includes a plurality of communication units and infrastructure equipment. The infrastructure equipment includes a plurality of base sites, each of which provides communication services to a corresponding service coverage area. The service coverage areas are arranged into one or more location areas, wherein each location area includes at least one service coverage area. When the communication unit becomes active in the communication system, the communication unit determines its registration type. When the communication unit is of a first registration type, the communication unit transmits a registration message to the infrastructure equipment whenever the communication unit enters a new location area. The registration message includes the communication unit's identification (ID) and registration type. When the communication unit is of a second registration type, the communication unit transmits the registration message to the infrastructure equipment whenever the communication unit enters a new service coverage area. Thus, when the infrastructure equipment receives a communication destined for the communication unit, the infrastructure equipment conveys the communication to the communication unit based on the communication unit's registration type.

For example, when the communication unit is of the second registration type, the infrastructure equipment transmits the communication to the communication unit via the base site serving the service coverage area from which the communication unit last registered. However, when the communication unit is of the first registration type, the infrastructure equipment might first page the communication unit via all the base sites serving the location area from which the communication unit last registered and then await an acknowledgment of the page before transmitting the communication to the communication unit via the base site that received the acknowledgment. By providing communication services to communication units based on registration type, the present invention facilitates simultaneous cellular and dispatch services in a communication system, while mitigating control channel activity and maintaining expedited call set-up for dispatch service.

Figure 1:
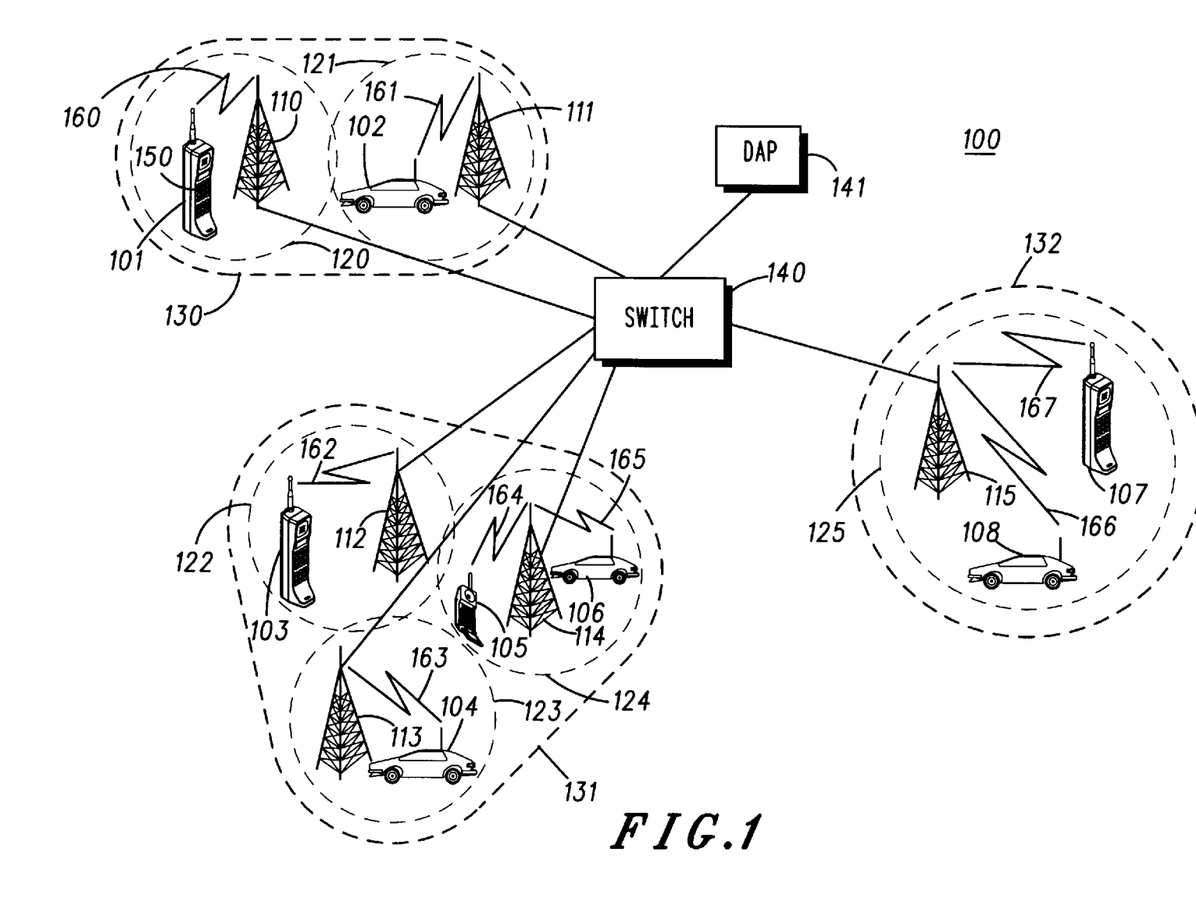
FIG. 1 illustrates a communication system in accordance with the present invention.

The present invention can be more fully understood with reference to FIGS. 1–4. FIG. 1 illustrates a communication system 100 in accordance with the present invention. The communication system 100 includes a plurality of communication units 101–108 and infrastructure equipment. The infrastructure equipment preferably includes a plurality of base sites 110–115, a switch 140, and a dispatch application processor (DAP) 141. The communication units 101–108 preferably comprise two-way communication devices, such as mobile or portable radios, radiotelephones, wireless data terminals, or two-way pagers. As shown, a communication unit 101 might include an alpha-numeric keypad 150 for use as later described. The switch 140, which is coupled to the DAP 141 and the PSTN (not shown), preferably comprises any one of a variety of cellular telephone switches manufactured by Northern Telecom.

Each base site 110–115 includes a transmitter and receiver that provide communication services to a respective service coverage area 120–125. As shown, the service coverage areas 120–125 are arranged into a plurality of location areas 130–132, wherein each location area 130–132 includes at least one service coverage area 120–125. For example, location area 130 includes service coverage areas 120 and 121, location area 131 includes service coverage areas 122–124, and location area 132 is a single cell location area including service coverage area 125 only.

Operation of the communication system 100 occurs substantially as follows in accordance with the present invention. When the communication units 101–108 are initially placed into service in the communication system 100, or, alternatively, at periodic intervals of service, the communication units 101–108 are programmed with a particular registration type. Each communication unit 101–108 is preferably programmed by storing the registration type in a memory (not shown) of the communication unit 101–108 either by downloading the registration type via a wired network (e.g., through an RS-232 port on the communication unit 101–108), by over-the-air programming of the communication unit 101–108, or by manually inputting the registration type via the communication unit's keypad (e.g., 150). In a preferred embodiment, each communication unit 101–108 is, at any particular time, of one of two registration types. The first registration type applies to communication units (e.g., 101, 105, 106, 108) that utilize standard cellular services (e.g., private calling) of the communication system 100; whereas, the second registration type applies to communication units (e.g., 102–104, 107) that utilize dispatch (i.e., group calling) services of the communication system 100. The communication units 101–108 can switch registration types via any one of the aforementioned programming methods. In addition, although only two registration types will be discussed herein, the concepts of the present invention are equally applicable to more than two communication unit registration types.

When a communication unit (e.g., 101) becomes active in the communication system 100 (e.g., upon powering on), the communication unit 101 determines its current registration type by reading it from memory. Upon determining its registration type, the communication unit 101 then determines its registration process. When the communication unit 101 is of the first registration type, the communication unit 101 registers with the DAP 141 whenever the communication unit enters a new location area 130–132. When the communication unit 101 is of the second registration type, the communication unit 101 registers with the DAP 141 whenever the communication unit enters a new base site service coverage area 120–125. The communication unit 101 determines what location area 130–132 or service coverage area 120–125 it is entering by monitoring outbound control messages transmitted by the base sites 110–115 on system control channels. A system control channel comprises a communication resource 160–166, such as a pair of frequencies in a frequency division multiple access (FDMA) system, a pair of time slots in a time division multiple access (TDMA) system, or an orthogonal code in a code division multiple access (CDMA) system. For example, in a TDMA system, the control channel comprises an outbound (base site-to-communication unit) time slot and a corresponding inbound (communication unit-to-base site) time slot.

Each base site 110–115 transmits control messages on a respective system control channel to the communication units in its respective service coverage area 120–125. The control messages include the base site's identification and an identification of the location area 130–132 that the base site 110–115 partially, or completely, serves. For example, base site 110 transmits outbound control messages that indicate its identification (e.g., 110) and the identification (e.g., 130) of the location area 130 that it is partially serving.

When the communication unit 101 receives the control message from the base site 110 and the communication unit 101 is of the first registration type, the communication unit 101 extracts the location area identification from the control message and compares the location area identification with a previous location area identification in memory, if one exists. If no location area identification exists or the current location area identification is different than the previous location area identification, the communication unit 101 registers with the DAP 141. The communication unit 101 registers by transmitting an inbound registration message to the DAP 141 on the system control channel via the serving base site 110 and the switch 140. The registration message preferably includes an identification of the communication unit 101 and the communication unit's registration type (e.g., 1). The DAP 141 stores the communication unit's identification and registration type together with the location area identification in a registration lookup table. The registration lookup table is described in detail below with regard to FIG. 2.

In an analogous manner, when the communication unit 101 receives the control message from the base site 110 and the communication unit 101 is of the second registration type, the communication unit 101 extracts the base site identification from the control message and compares the base site identification with a previous base site identification in memory, if one exists. If no base site identification exists or the current base site identification is different than the previous base site identification, the communication unit 101 registers with the DAP 141. In this case, the DAP 141 preferably stores the communication unit's identification and registration type together with the base site identification in the registration lookup table. Therefore, in summary, communication units (e.g. 101, 105, 106, 108) of a first registration type register with the DAP 141 each time they enter a new location area 130–132 as identified in the outbound control channel message; whereas, communication units (e.g. 102–104, 107) of a second registration type register with the DAP 141 each time they enter a new base site service coverage area 120–125. By requiring only those communication units utilizing dispatch service to register each time they enter a new service coverage area, the present invention reduces the quantity of inbound control channel activity, as compared with prior art systems that require all communication units to register each time they enter a new service coverage area.

When the DAP 141 receives a communication for the communication unit 101, such as a call from another communication unit (e.g., 102) or a dispatch operator, the DAP 141 extracts the stored registration information for the communication unit 101 from the registration table to determine the communication unit's registration type. Based on the communication unit's registration type, the DAP 141 determines how to convey the communication to the communication unit 101. When the communication unit 101 is of the first registration type, the DAP 141 extracts the location area identification associated with the communication unit 101 and determines whether the location area 130 is served by a single base site 110. In this particular case, the DAP 141 recognizes that location area 130 is served by two base sites 110, 111. However, when the DAP 141 receives a communication for communication unit 108, the DAP 141 will determine that location area 132 is served by one base site 115 only.

When the communication unit 101 is of the first registration type and the identified location area (e.g. 130) is served by more than one base site 110, 111, the DAP 141 pages the communication unit 101 from the base sites 110, 111 serving the location area 130. Upon receiving the page, the communication unit 101 transmits an acknowledgment of the page to the DAP 141 on the system control channel via one 110 of the base sites 110, 111 serving the location area 130. Upon receipt of the acknowledgment, the DAP 141 transmits the communication to the communication unit 101 via the base site 110 that received the acknowledgment. When the communication unit (e.g., 108) is of the first registration type and the identified location area (e.g., 132) is served by a single base site 115, the DAP 141 transmits the communication to the communication unit 101 via the base site 115, without first paging the communication unit 101.

On the other hand, when the communication unit (e.g., 102) is of the second registration type (i.e., a communication unit that registers upon entering every service coverage area 120–125), the DAP 141 simply extracts the identification of the base site 111 from the stored registration information and transmits the communication to the communication unit 102 via the base site 111. Therefore, by requiring communication units utilizing dispatch service to register each time they enter a new service coverage area, the present invention obviates the need to page communication units having dispatch service. By eliminating the paging of dispatch users, the present invention substantially reduces the call set-up delays associated with existing cellular systems that page a communication unit each time a call is received for the communication unit at a system controller. Therefore, the present invention provides a technique for combining the benefits of location area registration and coverage area, or per cell, registration to permit dispatch service to be utilized in a cellular communication system.

Figure 2:
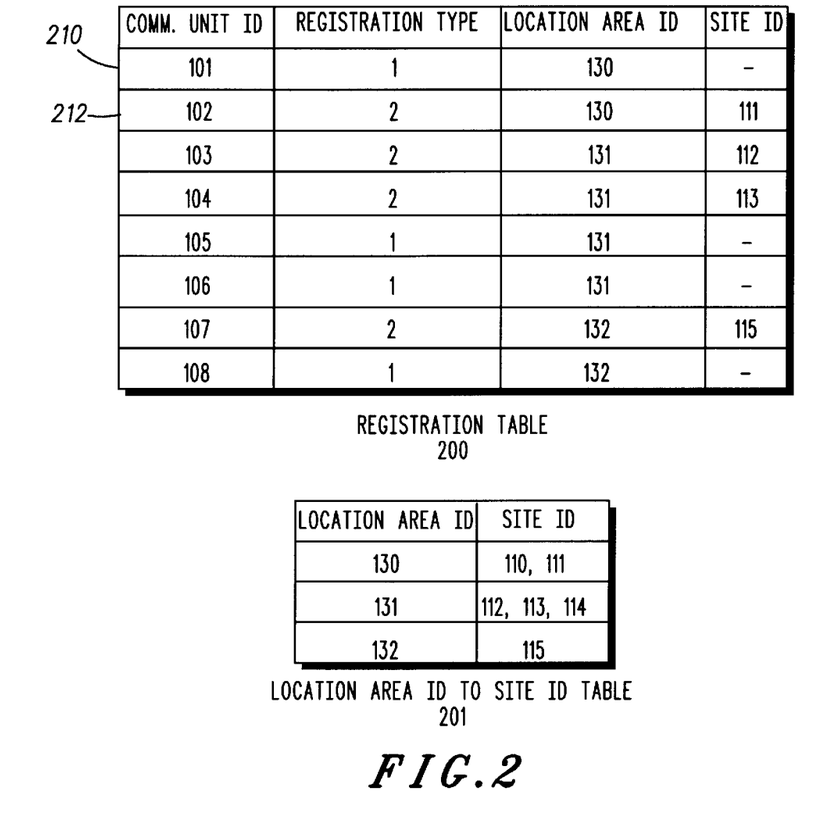
FIG. 2 illustrates stored registration information contained in a registration lookup table of a dispatch application processor in accordance with the present invention.

FIG. 2 illustrates exemplary stored registration information contained in a registration lookup table 200 of a DAP in accordance with the present invention. As shown, the registration lookup table 200 preferably includes a record (e.g., 210, 212) for each communication unit. Each record 210, 212 includes an identification (ID) of the communication unit, a registration type for the communication unit, a location area identification of the location area from which the communication unit last registered, and an identification of the base site receiving the registration message (for communication units of the second registration type only). The entries in the registration lookup table 200 are with reference to the communication system 100 of FIG. 1. It should be noted that although the registration lookup table 200 includes location area ID entries for communication units of the second registration type, these entries are preferential only to anticipate a change in mode of the communication unit from the second registration type to the first registration type, and are not necessary to implement the present invention.

As also shown in FIG. 2, the DAP preferably includes a location area ID to base site ID table 201 that lists the base sites serving the respective location areas. The exemplary entries in the location area ID to base site ID table 201 are also with reference to the communication system 100 of FIG. 1.

When the DAP receives a communication for a particular communication unit, the DAP extracts the appropriate record (e.g., 210) for the communication unit based on the target communication unit's identification. From the record, the DAP then determines the communication unit's registration type. For example, if the DAP received a communication for communication unit 101, the DAP would extract record 210 and recognize that communication unit 101 is of the first registration type.

Once the DAP determines the communication unit's registration type, the DAP determines how to convey the communication to the communication unit. As described above with regard to FIG. 1, when the communication unit is of the first registration type, the DAP either transmits the communication to the communication unit instantly (i.e., when the location area from which the communication unit last registered is serviced by only one base site) or pages the communication unit and then transmits the communication after acknowledgment of the page by the communication unit (i.e., when the location area from which the communication unit last registered is serviced by more than one base site). However, when the communication unit is of the second registration type, the DAP transmits the communication to the communication unit instantly via the base site identified in the base site ID entry of the communication unit's record (e.g., 212). In the above example, since the communication unit 101 is of the first registration type, the DAP determines whether the communication unit last registered from a location area serviced by more than one base site. Thus, the DAP extracts the base site ID entry from the location area ID to base site ID table 201 corresponding to the location area ID entry in the communication unit's record 210. Since the base site ID entry includes more than one base site (i.e., base sites 110, 111), the DAP determines that it will use the page and transmit conveyance approach.

Figure 3:
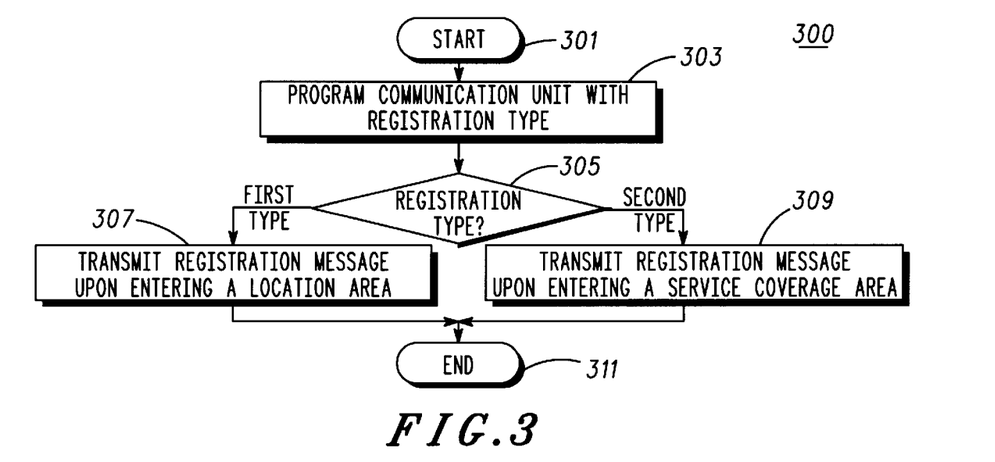
FIG. 3 illustrates a logic flow diagram of steps executed by a communication unit to register in a communication system in accordance with the present invention.
Figure 5:
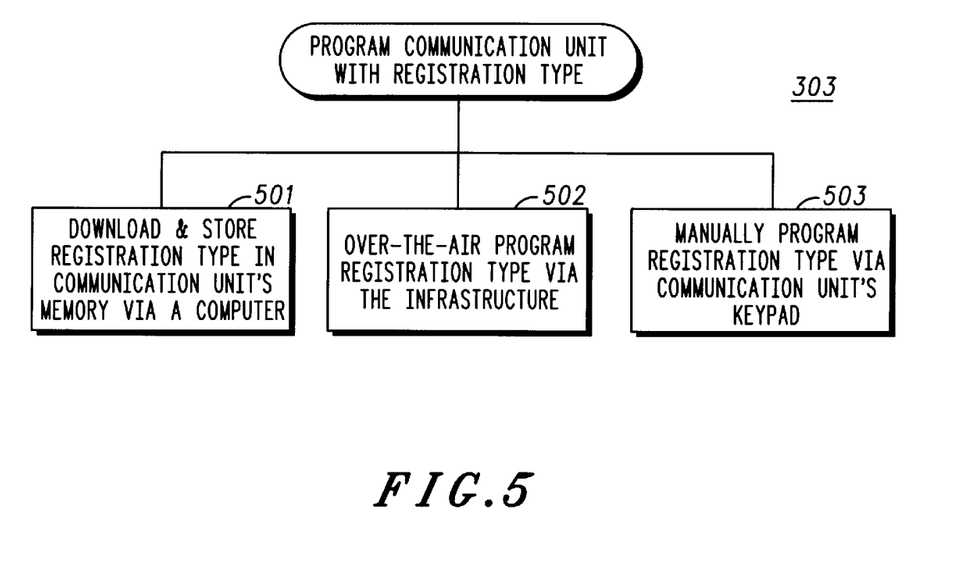
FIG. 5 illustrates a variety of techniques for programming a communication unit with a registration type in accordance with the present invention.

FIG. 3 illustrates a logic flow diagram 300 of steps executed by a communication unit to register in a communication system in accordance with the present invention. The logic flow begins (301) when the communication unit is programmed (303) with a registration type. In a preferred embodiment, the communication unit is programmed as either a first or a second registration type, the first registration type indicating that the communication unit intends to utilize standard cellular services only and the second registration type indicating that the communication unit intends to utilize dispatch services. The communication unit is preferably programmed by downloading the registration type from a computer into the communication unit and storing the registration type in a memory of the communication unit (as shown in block 501 of FIG. 5). In an alternate embodiment, the registration type might be provided to the communication unit from the DAP via over-the-air programming (as shown in block 502 of FIG. 5) or might be entered into the communication unit manually via the communication unit's keypad (as shown in block 503 of FIG. 5).

Upon receiving a registration type and becoming active (i.e., powering-up), the communication unit determines (305) its registration type by reading the registration type stored in memory. When the communication unit is of the first registration type, the communication unit transmits (307) a registration message to the DAP whenever the communication unit enters a new location area and the logic flow ends (311). On the other hand, when the communication unit is of the second registration type, the communication unit transmits (309) a registration message to the DAP whenever the communication unit enters a new service coverage area and the logic flow ends (311). In either case, the registration message includes the communication unit's identification and registration type, and receipt of the registration message at the DAP registers the communication unit in the communication system. As discussed above with regard to FIG. 1, the communication unit preferably determines which service coverage area or location area that it has entered by monitoring the outbound control messages transmitted by the base sites serving the service coverage areas and location areas. The outbound control messages include the location area identification and the identification of the base site transmitting the control message.

Figure 4:
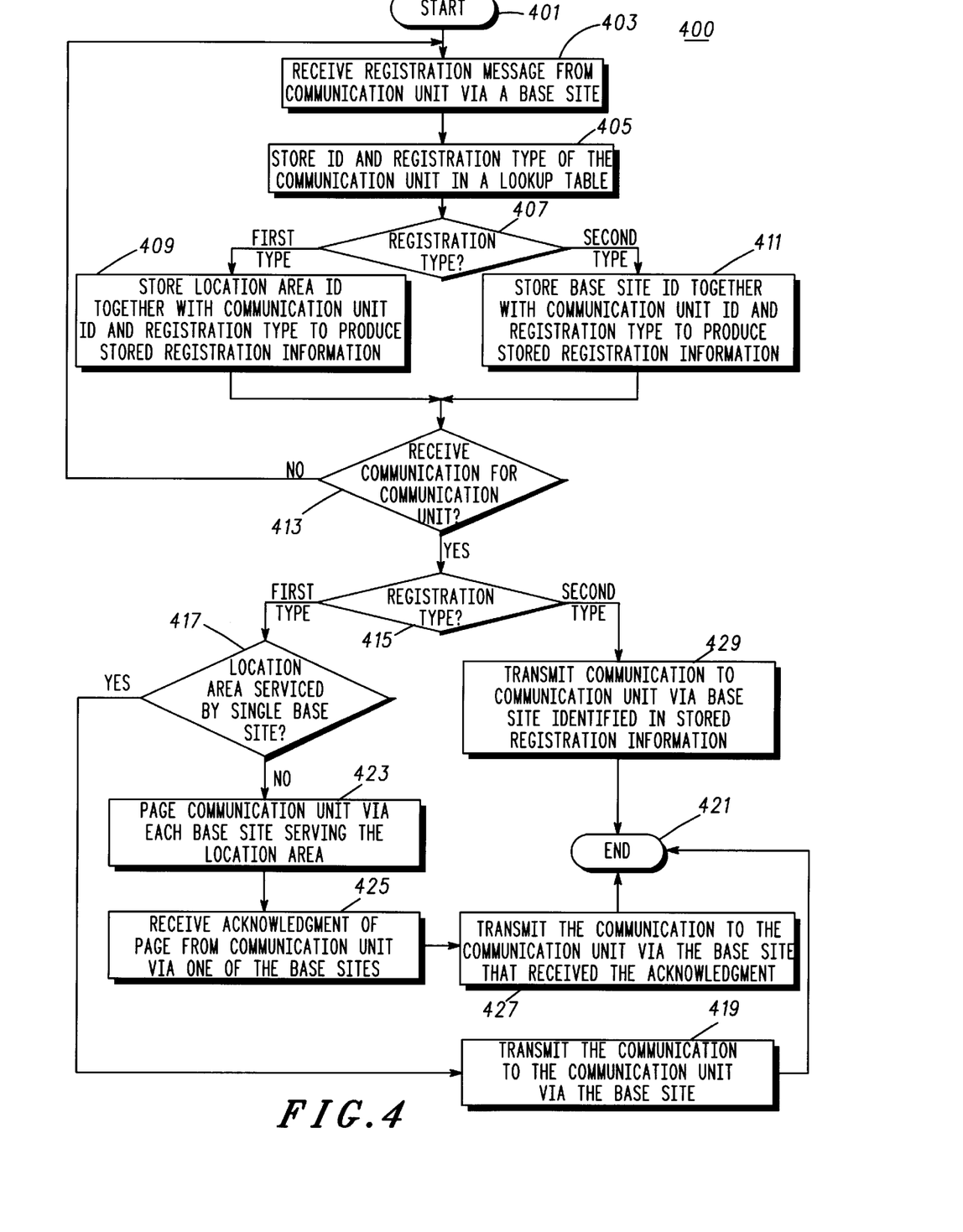
FIG. 4 illustrates a logic flow diagram of steps executed by a dispatch application processor to provide a communication to a communication unit in accordance with a preferred embodiment of the present invention.

FIG. 4 illustrates a logic flow diagram 400 of steps executed by a DAP to provide a communication to a communication unit in accordance with a preferred embodiment of the present invention. The logic flow begins (401) when the DAP receives (403) a registration message from the communication unit via a base site. As noted above, the registration message includes the communication unit's identification and registration type. The DAP stores (405) the communication unit's identification and registration type as entries of a record for the communication unit in a registration lookup table.

The DAP then determines (407) the communication unit's registration type from the registration message. When the communication unit is of the first registration type (registering upon entry into a new location area), the DAP stores (409) the identification of the location area from which the communication unit registered together with the communication unit's identification and registration type in the registration lookup table to produce the stored registration information for the communication unit. The DAP preferably obtains the location area identification from a table that lists the location area served by the base site that received the registration message. In an analogous manner, when the communication unit is of the second registration type (registering upon entry into a new base site service coverage area), the DAP stores (411) the identification of the base site together with the communication unit's identification and registration type in the registration lookup table to produce the stored registration information for the communication unit.

After the communication unit has registered, the DAP determines (413) whether it has received a communication for the communication unit. When the DAP has not received a communication for the communication unit, the DAP continues to receive (403) registration messages from the communication unit. When the DAP has received a communication for the communication unit, the DAP determines (415) the communication unit's registration type from the stored registration information in the registration lookup table.

When the communication unit is of the first registration type, the DAP determines (417), based on the stored registration information, whether the location area from which the communication unit last registered is serviced by a single base site. When the location area is serviced by a single base site, the DAP transmits (419) the communication to the communication unit via the base site and the logic flow ends (421). However, when the location area is serviced by more than one base site, the DAP pages (423) the communication unit via each base site serving the location area and awaits an acknowledgment of the page from the communication unit. Upon receipt (425) of the acknowledgment via one of the base sites, the DAP transmits (427) the communication to the communication unit via the base site that received the acknowledgment and the logic flow ends (421).

When the communication unit is of the second registration type, the DAP transmits (429) the communication to the communication unit via the base site identified in the stored registration information and the logic flow ends (421).

The present invention encompasses a method and apparatus for providing communication services to a communication unit in a communication system based on the communication unit's registration type. With this invention, the communication system can provide dispatch and standard cellular services to communication units in the system while mitigating inbound control channel activity, as compared with prior art systems that require all communication units to register whenever they enter a new service coverage area. In addition, by requiring those communication units utilizing dispatch service to register whenever they enter a new service coverage area, the present invention provides more expedient call set-up for dispatch users, as compared with prior art systems that require all communication units to register only when they enter a new location area. Further, the present invention recognizes when a first type communication unit is located in a location area served by only one base site and provides direct call transmission to the communication unit in such a case. In this manner, the present invention eliminates paging in single cell location areas and, accordingly, eliminates the paging response collisions resulting therefrom, thereby facilitating expedited call set-up to communication units of the first registration type that are resident in a single cell location area.

While the present invention has been particularly shown and described with reference to particular embodiments thereof, it will be understood by those skilled in the art that various changes in form and details may be made therein without departing from the spirit and scope of the present invention.

What we claim is:

1. In a communication system that includes infrastructure equipment and a plurality of communication units, the infrastructure equipment including a plurality of base sites, each of the plurality of base sites providing communication services to a corresponding service coverage area to produce a plurality of service coverage areas, the plurality of service coverage areas being arranged into at least one location area, a method for the infrastructure equipment to provide communication services to a communication unit, the method comprising the steps of:

receiving a registration message from the communication unit, the registration message including an identification and a registration type of a plurality of registration types of the communication unit, each registration type of the plurality of registration types corresponding to a unique registration process and each registration process corresponding to a unique call set-up procedure;

determining a registration type for the communication unit;

determining a location area of the at least one location area containing the communication unit; and when the communication unit is of a first registration type corresponding to a first registration process in which the communication unit registers with the infrastructure equipment upon entering into a location area of the at least one location area, the first registration process corresponds to a first call set-up procedure in which the infrastructure equipment pages the communication unit prior to conveying a communication to the communication unit, and the location area containing the communication unit consists of a single service coverage area, conveying a communication directly to the communication unit without first paging the communication unit.

2. The method of claim 1, further comprising the steps of:

when the communication unit is of the first registration type and the location area containing the communication unit consists of at least two service coverage areas, transmitting a page to the communication unit from each base site serving the location area;

receiving, by a base site serving the location area, an acknowledgment of the page from the communication unit; and transmitting, responsive to the acknowledgment, the communication to the communication unit via the base site that received the acknowledgment.

3. The method of claim 1, further comprising the step of:

when the communication unit is of a second registration type corresponding to a second registration process in which the communication unit registers with the infrastructure equipment upon entering into a service coverage area of the plurality of service coverage areas and the second registration process corresponds to a second call set-up procedure in which the infrastructure equipment conveys a communication directly to the communication unit, transmitting the communication to the communication unit.

4. In a communication system that includes a plurality of communication units, a dispatch application processor, and a plurality of base sites, each of the plurality of base sites providing communication services to a corresponding service coverage area to produce a plurality of service coverage areas, the plurality of service coverage areas being arranged into at least one location area, a method for the dispatch application processor to provide a communication to a communication unit, the method comprising the steps of:

receiving a registration message from the communication unit via a first base site, the registration message including an identification and a registration type of a plurality of registration types of the communication unit, each registration type of the plurality of registration types corresponding to a unique registration process and each registration process corresponding to a unique call setup procedure;

storing the identification and the registration type of the communication unit in a registration lookup table;

when the registration type is a first registration type corresponding to a first registration process in which the communication unit registers with the dispatch application processor upon entering into a location area of the at least one location area, storing an identification of a location area of the at least one location area served at least in part by the first base site in the registration lookup table together with the identification and the registration type of the communication unit to produce stored registration information;

when the registration type is a second registration type corresponding to a second registration process in which the communication unit registers with the dispatch application processor upon entering into a service coverage area of the plurality of service coverage areas, storing an identification of the first base site in the registration lookup table together with the identification and the registration type of the communication unit to produce the stored registration information;

upon receiving a communication for the communication unit, determining the registration type of the communication unit based on the stored registration information; and when the stored registration information indicates that the communication unit is of the first registration type, the first registration process corresponds to a first call set-up procedure in which the dispatch application processor pages the communication unit prior to conveying a communication to the communication unit, and a location area containing the communication unit consists of a single service coverage area, transmitting the communication to the communication unit via a base site serving the single service coverage area without first paging the communication unit.

5. The method of claim 4, further comprising the steps of:
when the stored registration information indicates that the communication unit is of the first registration type and the location area containing the communication unit consists of at least two service coverage areas, transmitting a page to the communication unit via each base site of the plurality of base sites serving the location area;

receiving an acknowledgment of the page from the communication unit via a base site serving a service coverage area within the location area; and transmitting the communication to the communication unit via the base site that received the acknowledgment.

6. The method of claim 4, further comprising the step of, when the stored registration information indicates that the communication unit is of the second registration type, transmitting the communication to the communication unit via the first base site.

7. A communication system comprising:
a plurality of base sites, each of the plurality of base sites providing communication services to a corresponding service coverage area to produce a plurality of service coverage areas, the plurality of service coverage areas being arranged into at least one location area;

a communication unit operable in a first mode of a plurality of modes to transmit a registration message when the communication unit enters a location area of the at least one location area and operable in a second mode of the plurality of modes to transmit the registration message when the communication unit enters a service coverage area of the plurality of service coverage areas, the first mode corresponding to a first call set-up procedure in which the communication unit is paged prior to receiving a communication, and the second mode corresponding to a second call set-up procedure in which the communication unit is not paged prior to receiving a communication, and wherein the registration message includes an identification of the communication unit and a registration type of a plurality of registration types corresponding to whether the communication unit is operating in the first mode or the second mode; and a dispatch application processor coupled to the plurality of base sites, the dispatch application processor being operable in a receive mode to receive the registration message via a base site of the plurality of base sites, to store the identification and the registration type of the communication unit in a registration lookup table, to store an identification of the location area served at least in part by the base site together with the identification and the registration type of the communication unit when the registration type is a first registration type of the plurality of registration types to produce stored registration information, and to store an identification of the base site together with the identification and the registration type of the communication unit when the registration type is a second registration type of the plurality of registration types to produce the stored registration information, the dispatch application processor being operable in a transmit mode to transmit a communication directly to the communication unit when the communication unit is of the first registration type and a location area containing the communication unit consists of a single service coverage area.

* * * * *